United States Patent [19]
Rodyniuk et al.

[11] Patent Number: 5,340,055
[45] Date of Patent: Aug. 23, 1994

[54] AIRCRAFT WING COVER AND METHOD OF ATTACHMENT

[75] Inventors: Michael Rodyniuk; Keevin Berg, both of Calgary, Canada

[73] Assignee: Air Cover Corporation, Calgary, Canada

[21] Appl. No.: 132,635

[22] Filed: Oct. 6, 1993

Related U.S. Application Data

[63] Continuation-in-part of Ser. No. 984,995, Dec. 2, 1992, Pat. No. 5,282,587.

[51] Int. Cl.⁵ .............................. B65D 85/68
[52] U.S. Cl. .................... 244/1 R; 150/166
[58] Field of Search ............ 244/1 R, 115, 213; 150/166

[56] References Cited

U.S. PATENT DOCUMENTS

| | | | |
|---|---|---|---|
| 1,427,448 | 8/1922 | Dornier | 244/1 R |
| 2,248,655 | 7/1941 | Bila | 150/166 |
| 2,453,403 | 11/1948 | Bogardus | 244/1 R |
| 3,044,516 | 7/1962 | Stoll | 150/166 |
| 4,598,883 | 7/1986 | Suter | 150/166 |
| 5,282,587 | 2/1994 | Rodyniuk et al. | 244/1 R |

*Primary Examiner*—David A. Bucci
*Assistant Examiner*—Anne E. Bidwell
*Attorney, Agent, or Firm*—Dennis T. Griggs

[57] ABSTRACT

A device and method is disclosed whereby a protective cover is positioned on the upper surface of an aircraft wing. The cover comprises a lightweight, ultraviolet stabilized material which is resistant to propagation of tears and does not absorb water. Cover material, overhanging the leading or trailing edges of the wing, is locally cutout in the area of protuberances to assist in providing a form fit when a plurality of cinch straps, attached to the leading and trailing edges, are tightened under the wing. Additional straps may be employed to secure the cover to the fuselage. The cover, when tightened, prevents significant ingress of air, protecting the upper surface.

2 Claims, 14 Drawing Sheets

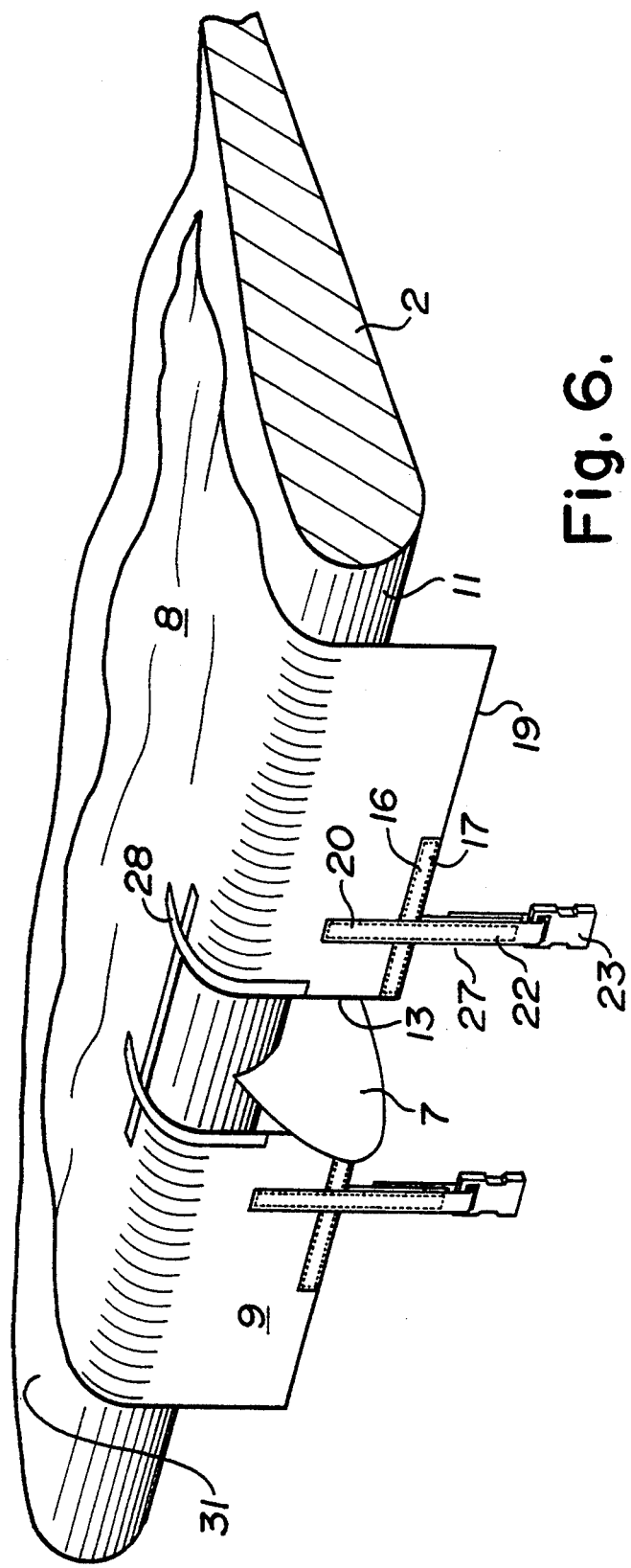

AIRCRAFT WING COVER AND METHOD OF ATTACHMENT

CROSS REFERENCE TO RELATED APPLICATION

This application is a continuation-in-part of pending application 07/984,995 filed Dec. 02, 1992 now U.S. Pat. No. 5,282,587.

FIELD OF THE INVENTION

The present invention relates to a protective cover for the wing of an aircraft, a novel cover-to-fuselage connecting means, and to the method for installing the cover.

BACKGROUND OF THE INVENTION

The airfoil or wing surfaces of an aircraft are subject to the effects of transient atmospheric conditions posed by the weather systems of the winter season. The effects may manifest as frost, snow or ice, normally upon the upper and vertical surfaces of the aircraft skin. It is well known in the aircraft industry that such contamination of the wings has serious detrimental effects upon aircraft aerodynamics with the potential danger for loss of lift and control. A recent 1988 example of the tragic consequences of attempting flight with affected wing surfaces was unfortunately demonstrated in the Air Ontario crash of a Fokker F-28 at Dreyden, Ontario, Canada.

For some decades, protective covers have been provided to protect the surfaces of aircraft wings. Generally their use has been limited to light aircraft such as smaller, privately owned aircraft. An early example of such a device is disclosed in U.S. Pat. No. 3,044,516, issued to Stoll in 1962. This reference describes a wing covering device as an envelope-like receptacle for snugly fitting over a wing tip in a glove-like relation.

The commercial passenger aircraft industry uses large aircraft comprising narrow and wide body jets with typical wing spans of 100 feet and 200 feet respectively. Use of protective covers for this case of aircraft has been tried, but has not been commercially successful due in part to the size and installation difficulties. Such early covers were fabricated from heavy fabrics which absorbed water and tended to become unwieldy when wet. The cover could freeze into a stiff shape or worse, freeze to the wing surface.

Modem commercial aircraft surfaces are highly engineered components with surface finishes and structures which are particularly delicate and susceptible to damage and stresses other than those imposed by flight. Access for maintenance personnel to walk on the wing surfaces, for installation or removal of a cover, is now severely restricted and with the increased use of composite materials construction, walking loads are not allowed at all. Contact of the surfaces with metal fasteners, and the like, such as grommets disclosed by Stoll, is unacceptable. On many aircraft, delicate instruments and devices are mounted on the wing surfaces. These devices are fragile and must avoid mechanical damage. As an example of such a device, static wicks are located on the wing tips, which are adapted to discharge static during flight.

The airline industry is regulated under the auspices of the FAA in the United States, the MOT in Canada and similar agencies in other countries. These regulatory bodies require preventative de-icing and similar safety measures be performed for aircraft flight surfaces under certain weather conditions prior to takeoff. Presently, a typical treatment comprises applying a heated glycol solution to the wings. Generally, this is accomplished with a truck and boom arrangement whereby a water cannon directs a 160° F. glycol solution onto the wings, removing snow, ice and frost with a combination of mechanical force and melting action. For smaller narrow body aircraft such as the McDonnell Douglas 80 (MD-80) or the Boeing 737, the amount of glycol used could be 20 to 200 US gallons per wing, dependent upon the level of contamination. A wide bodied aircraft such as the Boeing 747 could require up to 2000 US gallons per wing. The spent glycol flows to the tarmac surface where it can eventually cause damage to the concrete, or can pose a serious environmental impact if it reaches permeable ground. Glycol may be collected for recycling or an ash-like absorbent material is used to absorb the spent glycol and the waste is shipped to an industrial landfill. In some cases, the glycol is simply left on the tarmac with the attendant results.

The disadvantages to the glycol de-icing system include:
  the significant cost of the glycol and procedures;
  serious delays and interruption of the airline departure schedule; and
  the environmental impact.

With this background in mind, it was the objective of the present invention to provide a wing cover, suitable for use with large aircraft, which could be easily installed and removed and which would result in reduced consumption of glycol.

SUMMARY OF THE INVENTION

In accordance with the invention, an improved protective cover for an aircraft wing is provided.

More particularly, the cover comprises a generally wing-shaped panel having leading and trailing portions which overhang the leading and trailing edges of the wing. The panel has a length sufficient to extend along most of the length of the wing, from its root to adjacent its tip. A plurality of strap means are provided at spaced points along the length of the cover. The strap means are connected to the cover's overhang portions and are operative to secure them together and to cinch the panel snugly to the wing surface.

The design of the cover has been influenced by the solution of unforeseen problems which were discovered in connection with prototypes in the course of the development of the product. More particularly, it was found:

That it was desirable to anchor the root or inner end of the cover to the fuselage as otherwise the outwardly tapering characteristic of the wing and the action of the wind getting between cover and wing can work the cover out toward the wing tip or twist it around one wing edge or the other;

That it was necessary to form cut-outs in the overhang portions so that the cover would have a form-fit around the wing's protuberances located adjacent the wing edges, such as vortex generators, fairings, engine mounts and air dams. If this was not done and the cover was simply stretched or "tented" over the protuberance, air would enter through the openings created and would form frost and snow on the wing surface;

That it was desirable to space the strap means less than 12 feet apart along the length of the panel, to enable two workers to efficiently install the cover. If the spacing was too great and conditions were windy, the workers had difficulty reaching back to a cinched portion to grasp the loose portion to cinch it at the next station; and That it was necessary to form the panel of lightweight ultraviolet stabilized material which would not absorb water. A suitable material was found to be woven polyethylene, commonly used as lumber wrap. The woven nature of the material lends it the ability to resist propagation of tears—a useful feature in this application. However, this type of material was found to be relatively weak. It was liable to tear if the connecting straps were secured directly to the cover material and cinching stress was applied. It was therefore found desirable to form an anchoring "base" for the connecting straps.

More particularly, the base comprised first and second lengths of webbing extending parallel and adjacent to the cover edge with one overlying the other, so that they sandwiched the cover between them. The anchor base further preferably comprised a third length of webbing extending laterally and inwardly from the first and second lengths, along the intended line of the cinching force. The cinching strap was secured to the T-shaped anchor so formed.

In one broad aspect then, the invention is a protective cover for an airplane wing, comprising:

a substantially wing-shaped panel having a root portion and leading and trailing edges, said panel being adapted to cover the upper surface of an airplane wing along part of its length, said panel having sufficient width so that a portion overhangs the leading edge of the wing and preferably overhangs both edges;

the panel being formed of lightweight, ultraviolet-stabilized material which does not absorb any significant amount of water;

the leading overhang portion being cut-out so as to form-fit around edge protuberances of the wing to be covered; and an array of strap means being positioned along the length of the cover in spaced-apart relation, for extending beneath the wing to secure the leading and trailing edges of the panel and to cinch the panel to the wing;

said strap means being located at points spaced apart less than about 12 feet.

In a second aspect of the invention, a novel combination of a protective cover and a fuselage restraining means is provided, said cover being adapted to cover the upper surface of a tapered wing of an aircraft having a fuselage, comprising a substantially wing-shaped panel having a root portion and leading, trailing and root edges, said restraining means comprising:

a strap means formed into a loop about the fuselage and being secured to the panel at its root edge, adjacent to the panel's leading edge for anchoring the root portion of the panel to the aircraft fuselage; or alternately a strap means secured to the panel substantially along a path of shortest distance extending from the panel's trailing edge, adjacent the fuselage, to the panel's leading edge and connecting to a belly strap extending beneath the fuselage for anchoring the root portion of the panel to the aircraft fuselage; and one or more rib means being secured to the panel, extending laterally from the strap means towards the panel's root edge to assist in fort-fitting the root portion of the panel to the wing.

The protective cover lends itself to a novel and efficient process of installation on the wing of a low wing aircraft. This process comprises:

(a) rolling the wing tip end of the panel toward its root portion to form a single roll having a longitudinal axis and bottom portion with the root portion free;

(b) placing the roll up onto the root area of the wing's upper surface, the roll axis being oriented transverse to the lateral extension of the wing, the roll further being oriented such that the root portion of the panel projects from the bottom portion of the roll and faces the wing root whereby the roll may be directly unrolled along the wing;

(c) securing the root portion of the panel to the fuselage;

(d) securing the root portion of the panel to the wing by connecting a first pair of associated strap members, respectively attached to the leading and trailing edges of the panel and extending beneath the wing, and cinching the panel's leading and trailing edges together using the strap members to form-fit the root portion to the wing;

(e) unrolling the panel away from the wing root and exposing a second pair of associated strap members, spaced from the first pair, and an unrolled panel portion;

(f) securing the unrolled panel portion to the wing by connecting and cinching the second pair of associated strap members to form-fit the unrolled panel portion to the wing; and (g) repeating steps (e) and (f) of unrolling and securing the unrolled panel portions until the panel has been completely rolled out and covers the wing with a form-fit.

In a fourth aspect of the invention, an installation process is provided for covering the wing surface of a high wing aircraft, such as a De Havilland DH-8. The wing is attached at its root and extends laterally outwards from both sides of an an aircraft fuselage having a longitudinal axis. In this case, the wing may be defined as having a longitudinal axis and an upper surface comprising a central root area and first and second wing tips. The protective cover is a wing surface-shaped panel having a central root portion and first and second wing portions extending outwardly therefrom and ending with first and second tip portions.

The process comprises:

rolling each of the tip portions toward the root portion to form a double-roll having first and second sides and a longitudinal axis;

placing the double-roll up onto the root area of the wing's upper surface, the longitudinal axis of the double-roll being oriented transverse to the longitudinal axis of the wing and being centered on the fuselage longitudinal axis, whereby the first and second roll members may be unrolled along the wing surface, in both directions toward the wing tips; and unrolling and securing each side of the double-roll as previously described with the low-wing version of the cover.

DESCRIPTION OF THE DRAWINGS

FIG. 6 is a perspective view of part of the cover fitted around a protuberance;

DESCRIPTION OF THE PREFERRED EMBODIMENT

Figure 1:
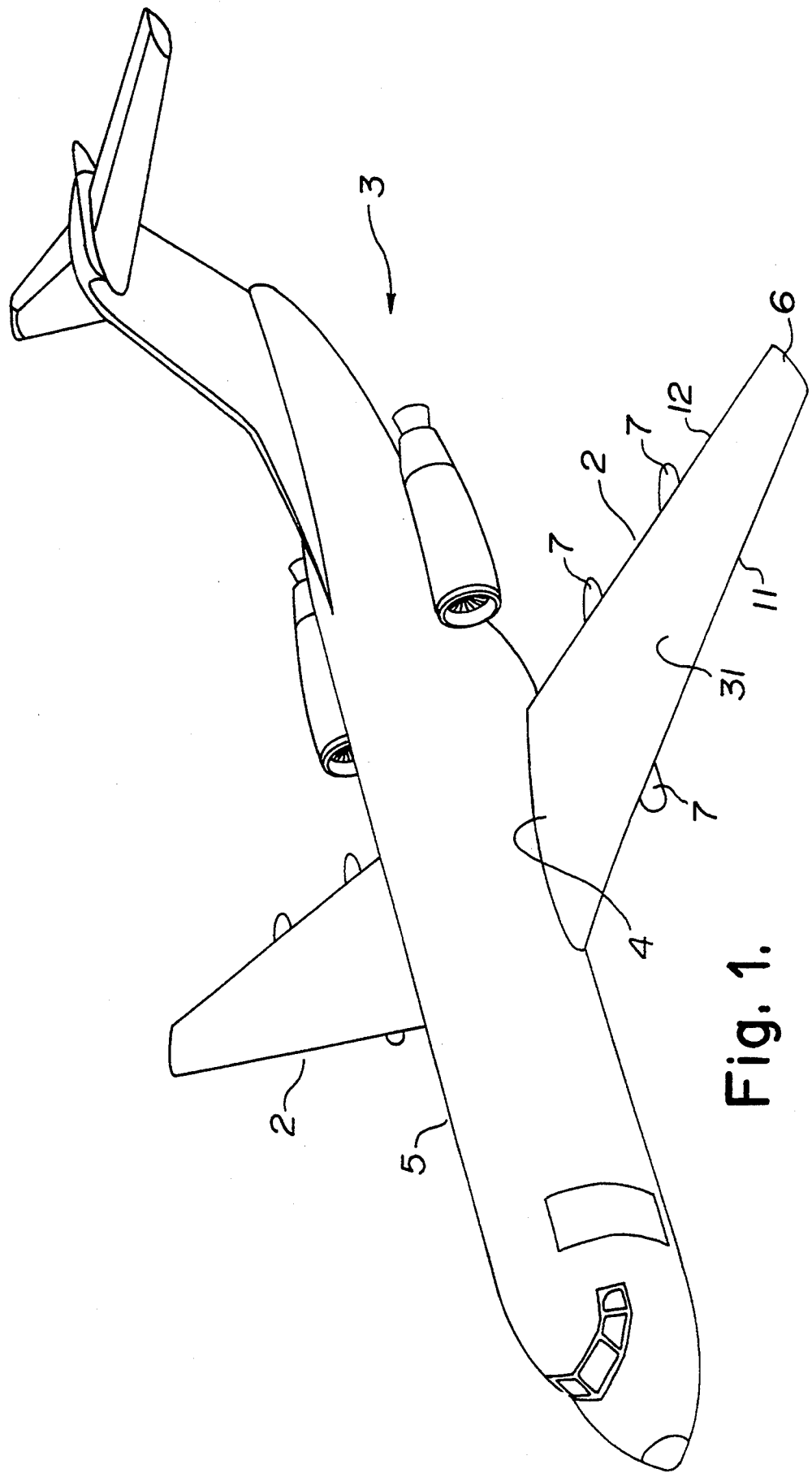
FIG. 1 is a perspective view of a low-wing jet aircraft.

In one version of the invention, a separate protective cover 1 is provided for each wing 2 of a low-wing passenger jet aircraft 3, such as the MD-80.

The upper surface 31 of the wing 2 has a root portion 4 adjacent the fuselage 5 and extends laterally in tapering fashion out to the wing tip 6. The edges and under-surfaces of the wings of most passenger jet aircraft have protuberances 7, such as air-dams, vortex generators, engine mounts and fairings.

The cover 1 is formed of lightweight, woven, ultraviolet-stabilized, tear-resistant material which will not absorb water. A suitable material is woven polyethylene available from Bonar Inc. and marketed under the trade-mark FLEXENE PLUS.

Figure 2:
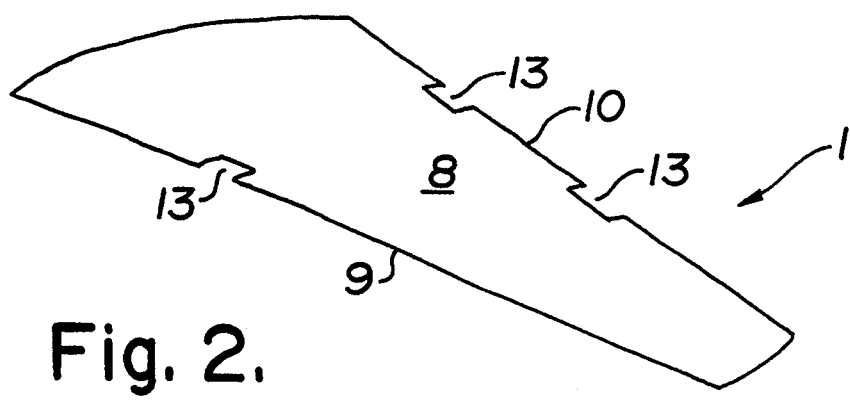
FIG. 2 is a perspective view of a cover panel shaped to conform to the wing of the aircraft according to FIG. 1.
Figure 3:
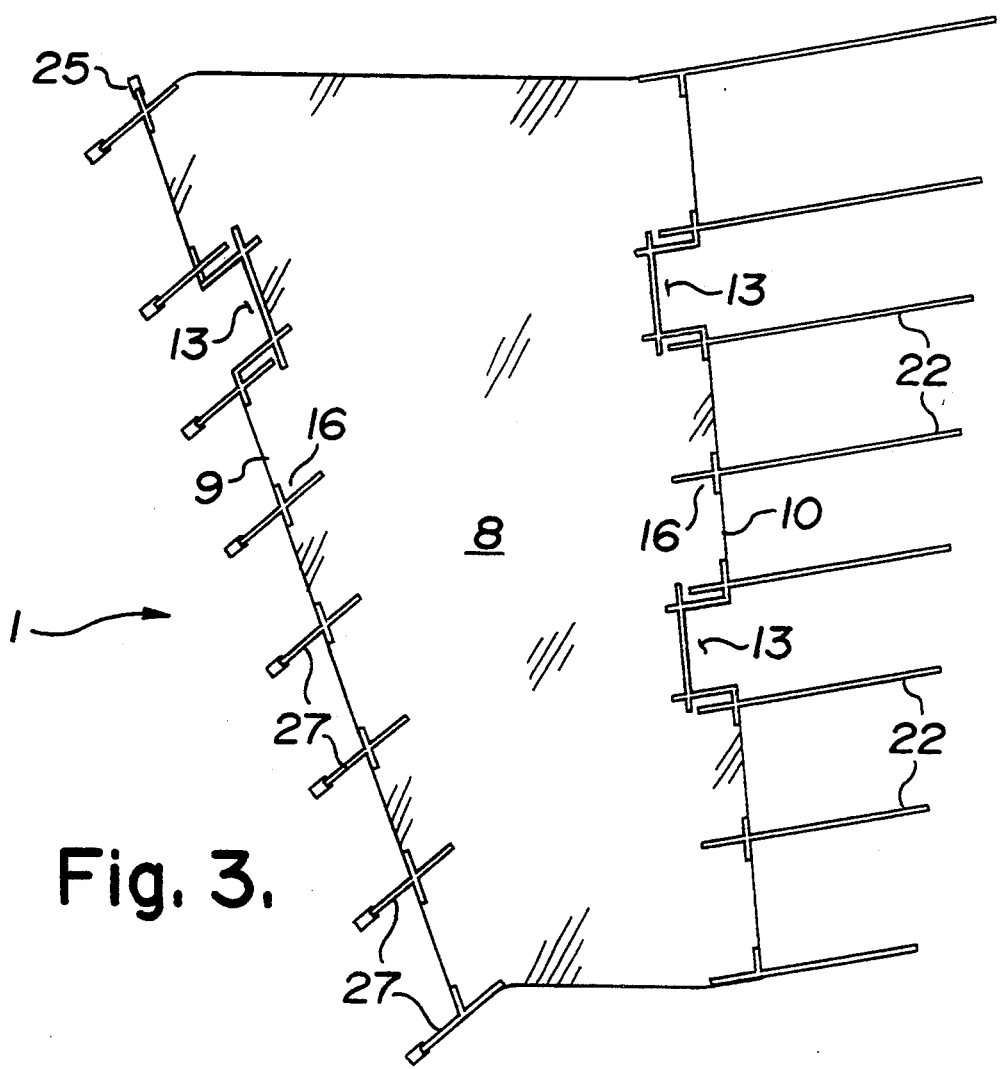
FIG. 3 is a top plan view of the cover of FIG. 2 showing cut-outs and strap assemblies.

As shown in FIGS. 1, 2 and 3 the cover 1 incorporates a panel 8 that is wing-shaped. The panel 8 is wider that the aircraft wing 2 so that it has overhang portions 9, 10 at the leading and trailing edges 11, 12 of the wing.

Cut-outs 13 are formed in the overhang portions 9, 10. These cut-outs 13 correspond with the wing protuberances 7 and function to enable the panel 8 to have a form-fit when it is cinched to the wing 2. This is illustrated in FIGS. 4, 6.

Figure 4:
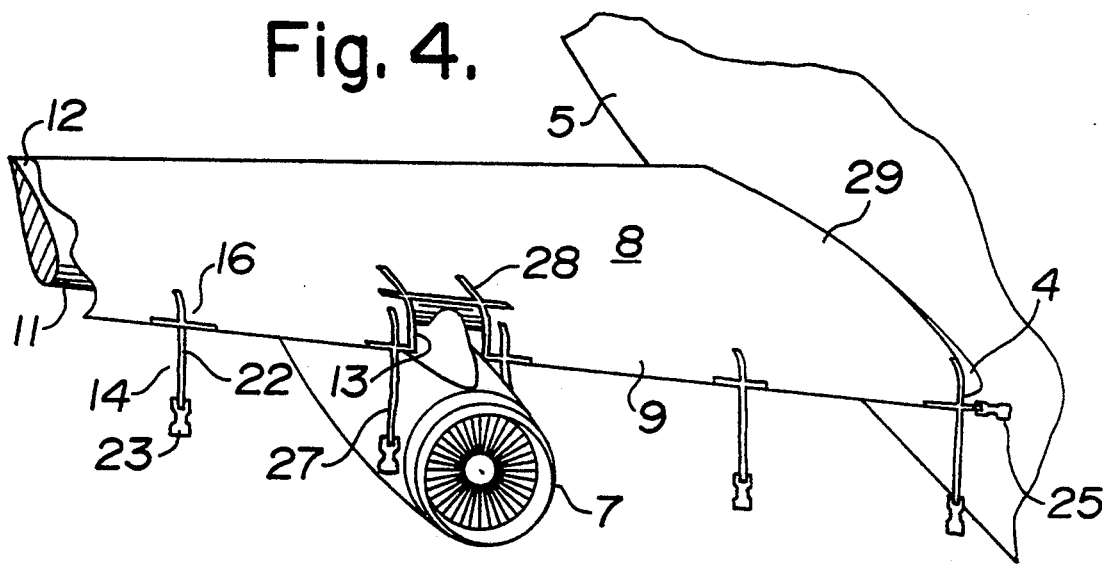
FIG. 4 is a perspective view showing a cover in place on a wing with the straps undone and a cut-out fitted to a protuberance.
Figure 4A:
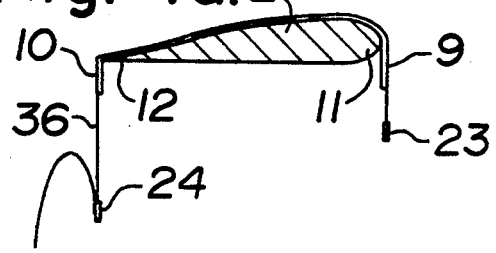
FIG. 4a is a sectional view of FIG. 4.
Figure 4B:
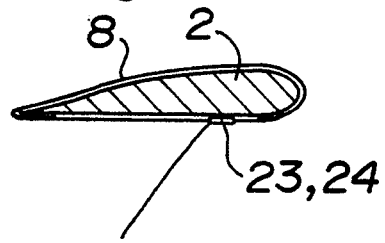
FIG. 4b is a sectional view of FIG. 4, but with the straps done up.
Figure 7:
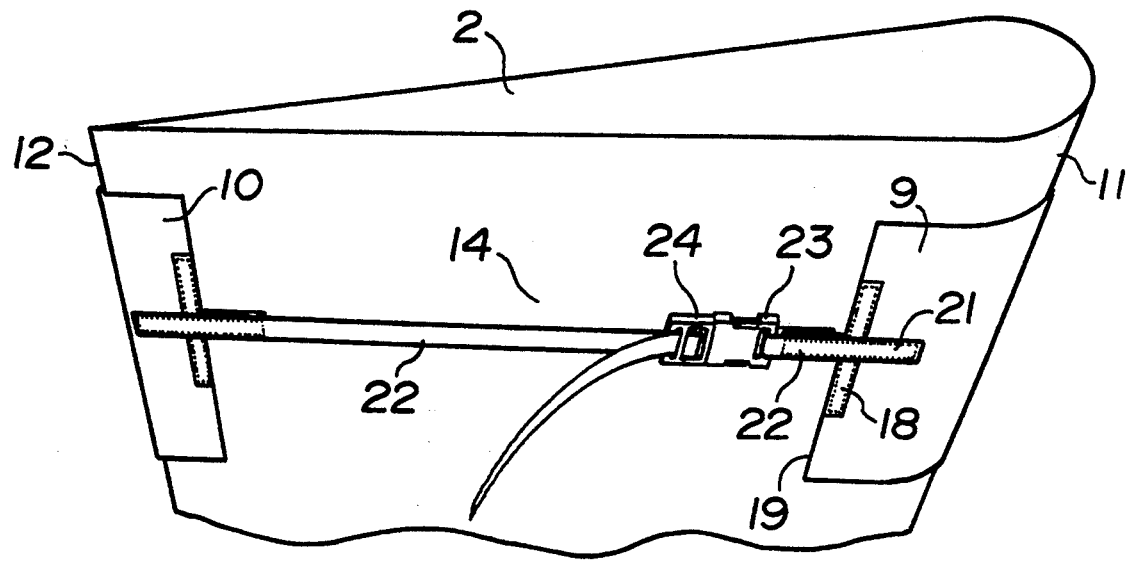
FIG. 7 is a perspective view from below of a strap assembly secured to edges of the panel.
Figure 8:
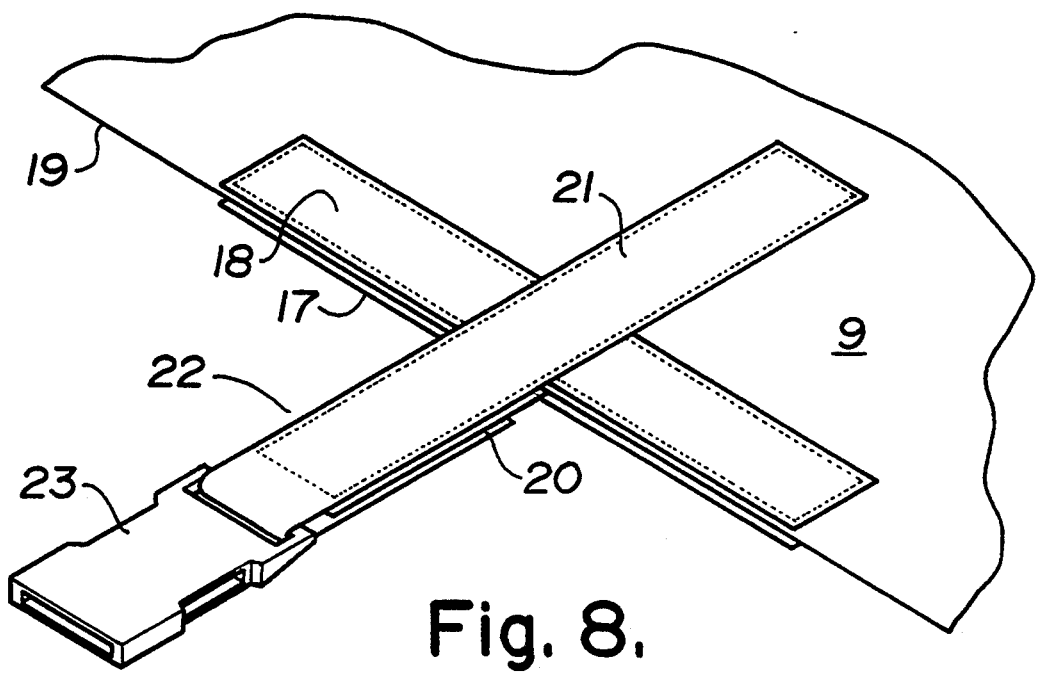
FIG. 8 is a perspective view of part of a strap assembly.
Figure 9:
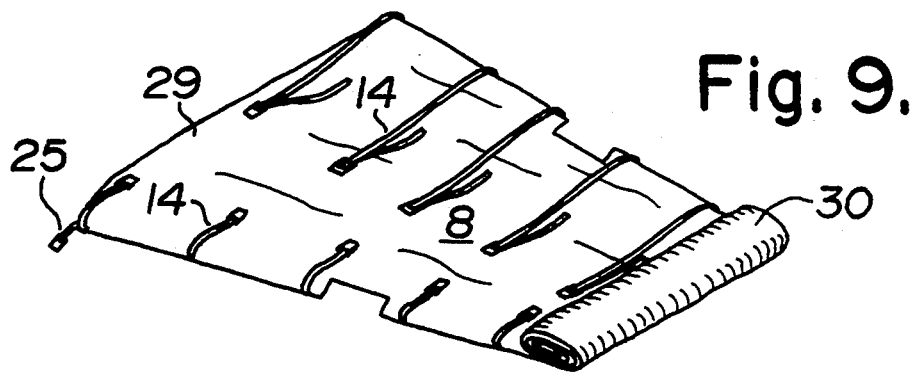
FIG. 9 is a perspective view of a panel (strap assemblies not shown) being rolled up in preparation for installation.
Figure 10:
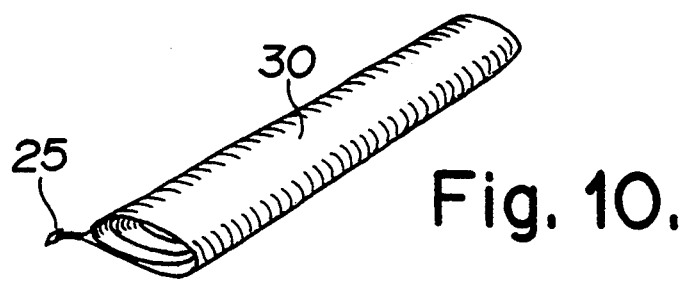
FIG. 10 is a perspective view of the panel of FIG. 9 in a fully rolled up state, ready for installation.

Having reference to FIGS. 4, 7 and 8, the cover 1 includes associated pairs of strap assemblies 14, comprising fastener means, for securing and cinching the panel 8 to the wing 2. More particularly, each strap assembly 14 comprises a T-shaped anchor 16 formed by overlain top and bottom lengths of edge webbing 17, 18, sandwiching the panel edge 19 between them, and inwardly extending overlain lengths 20, 21, which also extend out beyond the panel edge to form a strap 22 which carries a buckle 23 or fastener 24. Each strap 22 is aligned substantially parallel to the forces generated by the cinching action of each strap assembly 14. The overlain, paired lengths of webbing are sewn to each other and the panel 8, to provide an anchor 16 that distributes stress so that tearing is avoided. There are thus provided strap means for securing and cinching together the leading and trailing overhang portions 9, 10, to pull the panel 3 into close form-fit with the wing 2. The strap means are located at points spaced apart along the panel edges at distances of less than about 12 feet.

Figure 5:
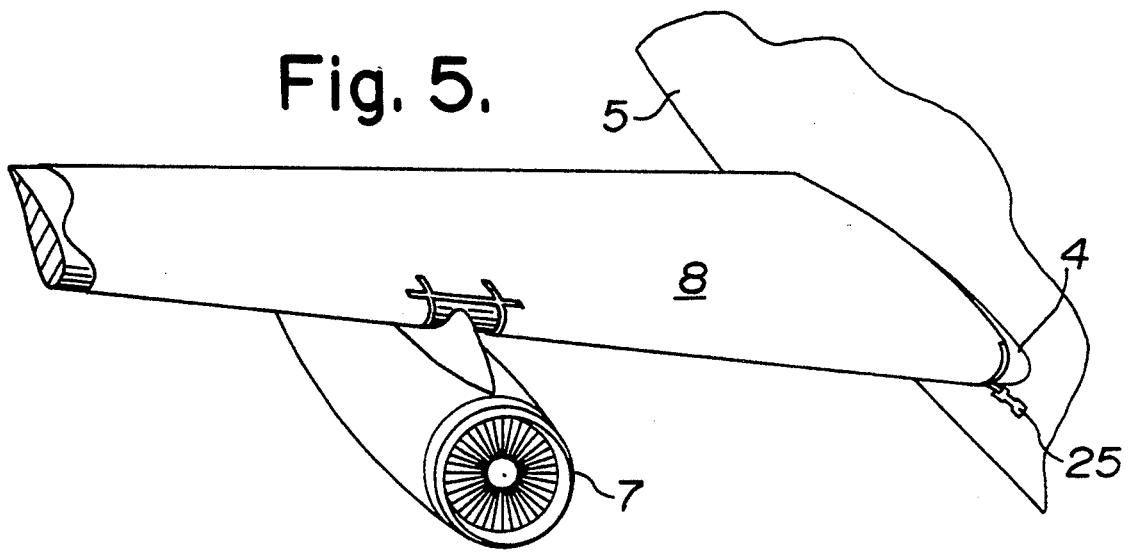
FIG. 5 is a view similar to FIG. 4, but with the straps done up.
Figure 5A:
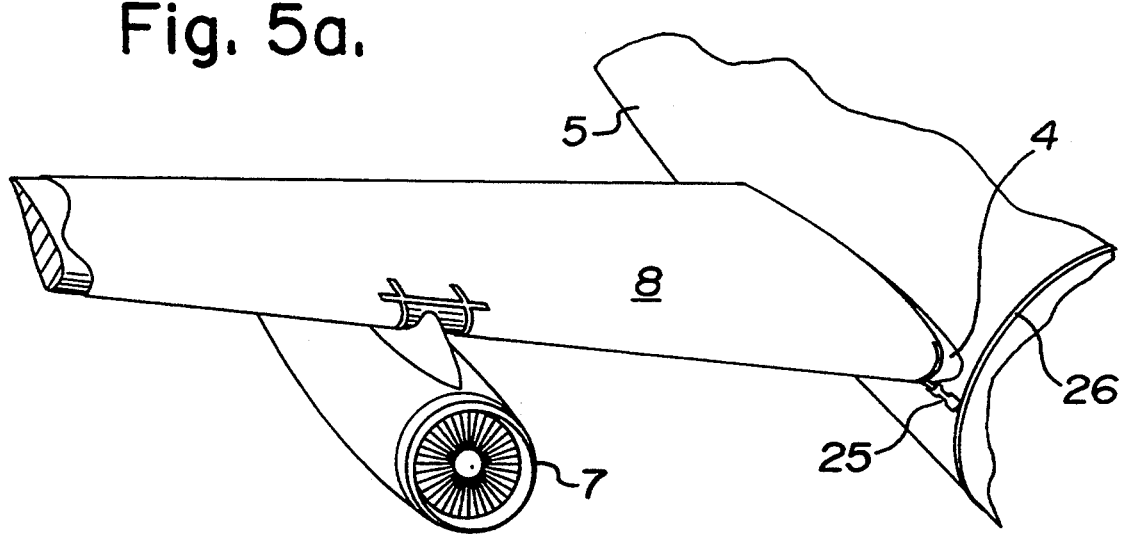
FIG. 5a is a view similar to FIG. 4, but with the straps done up and the panel being connected to the collar.

The tapered nature of the wing 2 encourages the panel 8 to creep away from the fuselage under cinching and wind loads, exposing the root portion 4 of the wing's upper surface 31. Retaining means are provided as shown in FIG. 5a for retaining the panel 8 in place with respect to the fuselage 5. More particularly, the retaining means comprises strap assemblies 25, located at the root areas of each panel 3, for connection with a loop or collar 26. The collar 26 is adapted to extend around the fuselage 5 and, when connected to the strap assemblies 25, it holds the cover 1 in place longitudinally and helps to restrain it from twisting due to wind action.

Figure 5B:
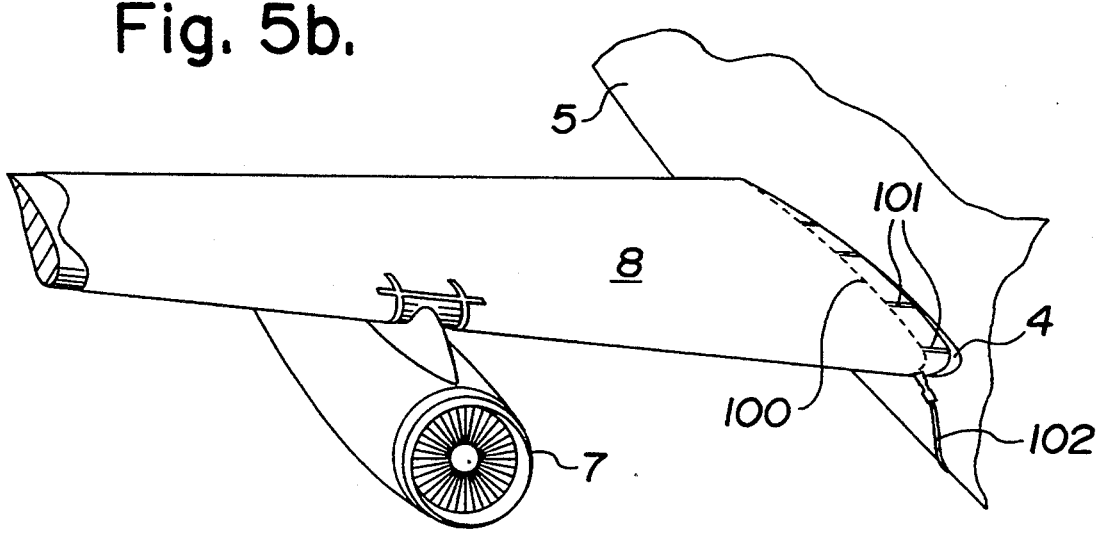
FIG. 5b is a view similar to FIG. 5a, but with the panel being fitted with ribs and being connected to a fuselage belly strap.
Figure 5C:
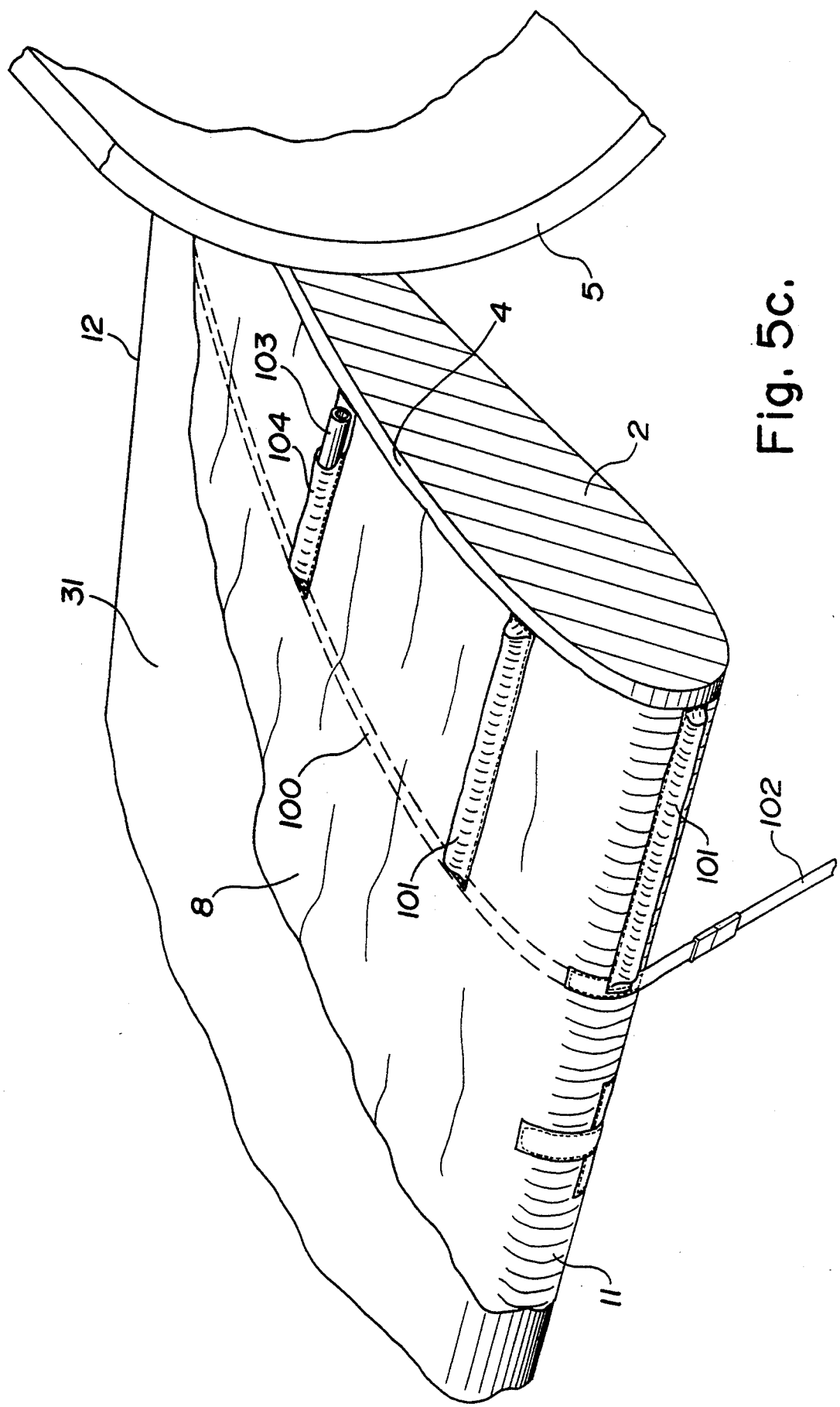
FIG. 5c is a perspective view of part of the cover and the strap and rib restraining means, with particular detail of the ribs.

Alternately as shown on FIGS. 5b and 5c, the retaining means may comprise a root strap assembly 100 and resilient ribs 101. The root strap assembly 100 is secured to the root portion of the panel 8. The strap assembly 100 extends substantially along a path which represents the shortest contiguous distance from the trailing edge 12, adjacent the fuselage 5, over the upper surface 31 of the wing, and to the leading edge 11 for connection to a belly strap 102. The belly strap 102 extends beneath the fuselage 5 for connection to a belly strap from a panel covering the opposing wing. When tensioned by cinching the belly strap 102, the root strap assembly 100 and attached panel 8 are disinclined from movement relative to the fuselage 5.

The ribs 101 are secured to the panel 8, substantially perpendicular to the panel's edge; one near the wings's leading edge 11, and additional ribs being placed in spaced-apart relation along the wing root 4, as required. The ribs 101 act to press the root portion of the panel 8 into close fit with the root portion 4 of the wing 2. The ribs 101 are suitably constructed of resilient material 103 such as neoprene tubing, enveloped in an elongated pocket of webbing 104 sewn to the panel 8.

In addition, strap assemblies 27 are provided on each side of the cut-outs 13 to secure the overhang portion edges to provide a firm, tight fit of the cut-out edge to the wing 2. Reinforcing webbing 28 is also provided around the cut-outs 13 to distribute stress.

Figure 11:
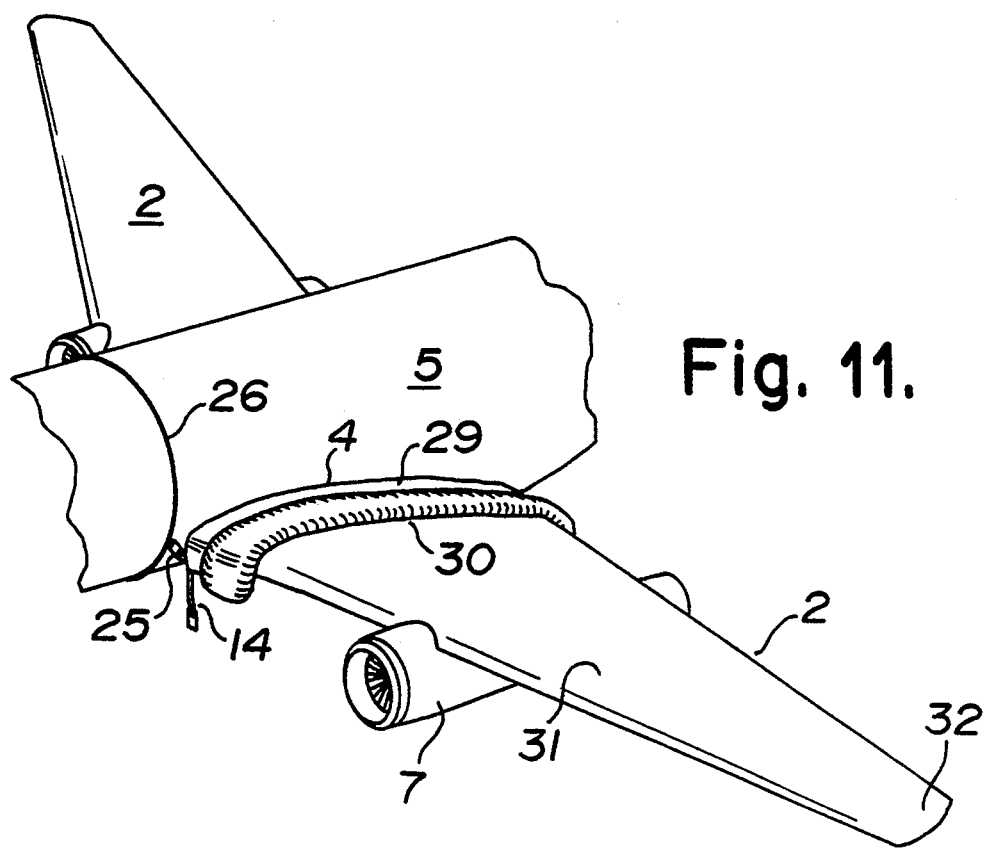
FIG. 11 is a perspective view of the roll of FIG. 10 in place on the wing, connected to the collar.
Figure 12:
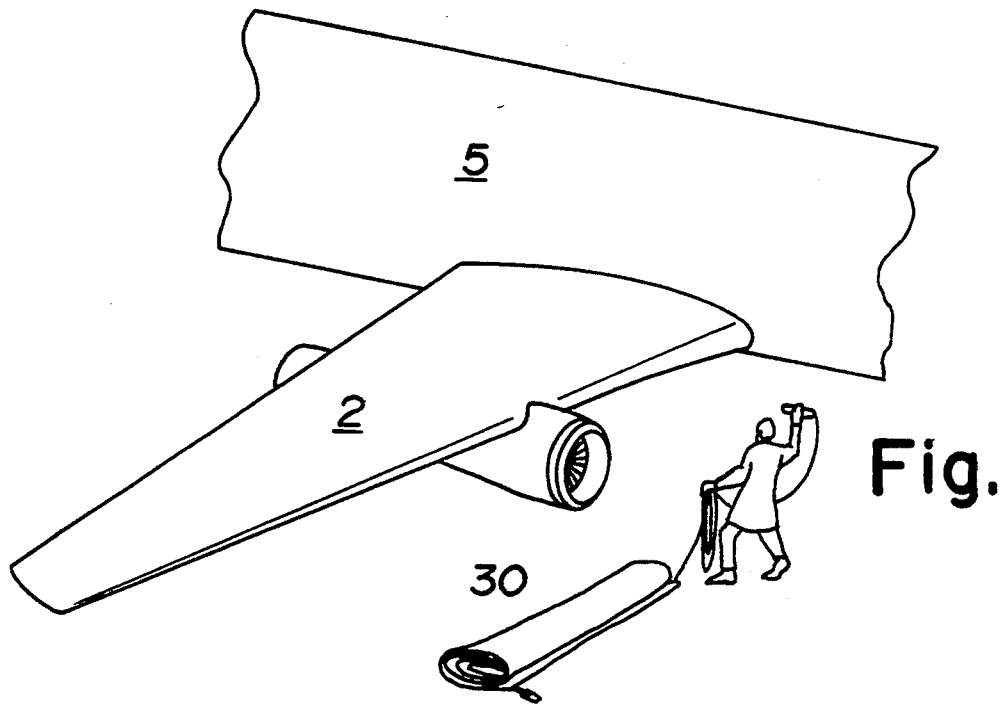
FIGS. 12-17 show in simplified form the installation of the cover.
Figure 13:
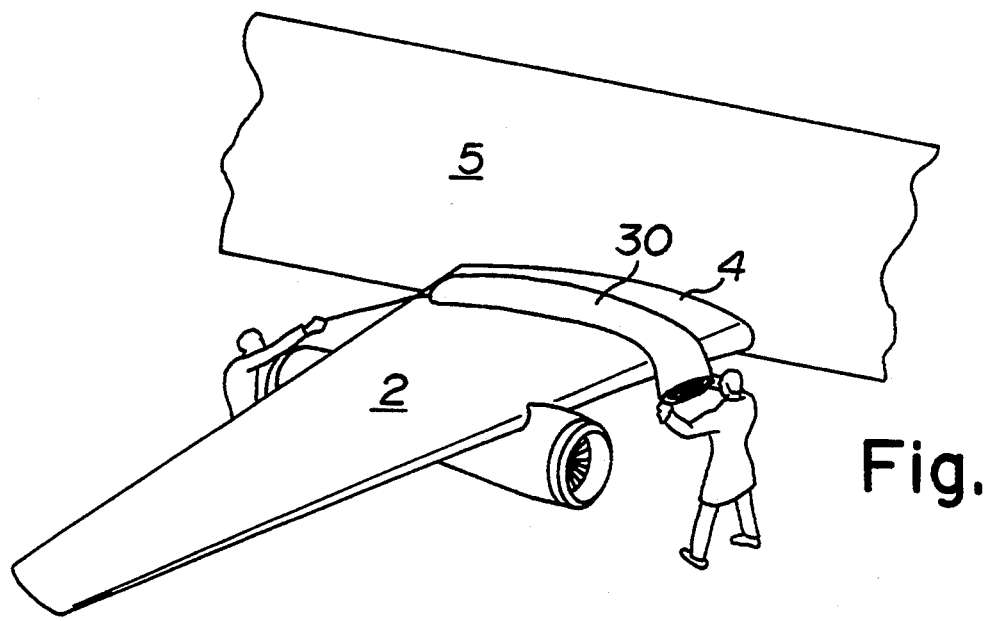
Figure 14:
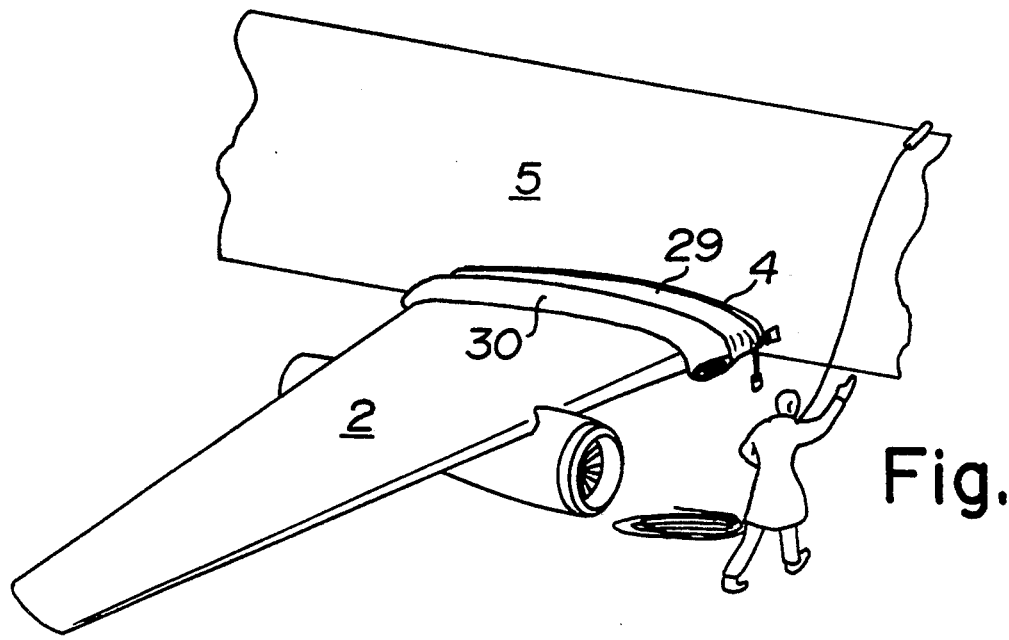
Figure 15:
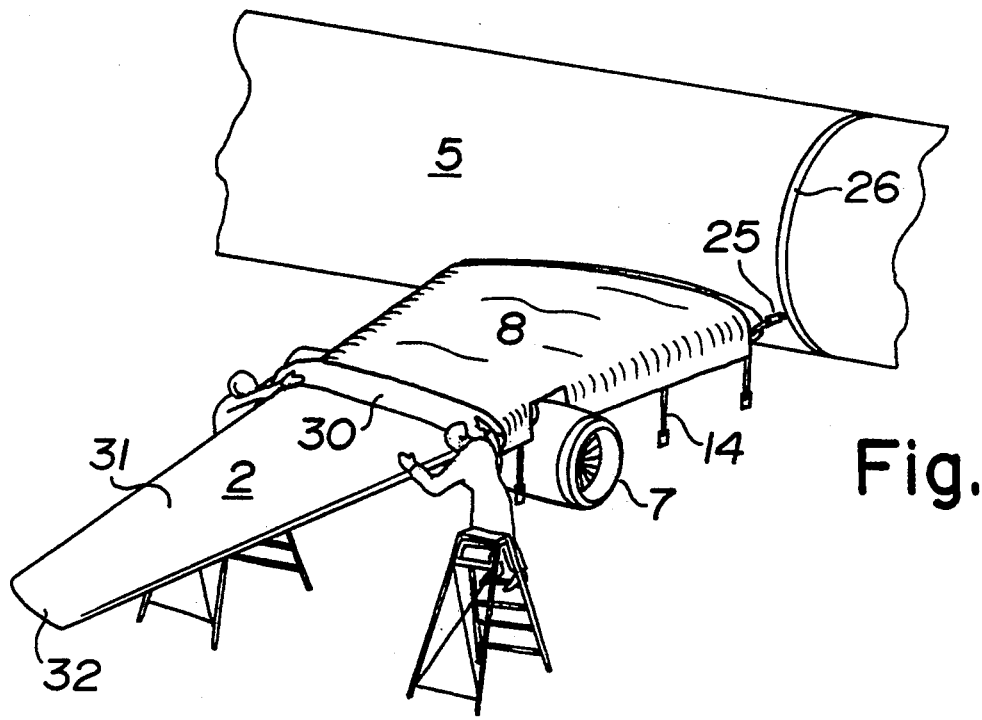
Figure 16:
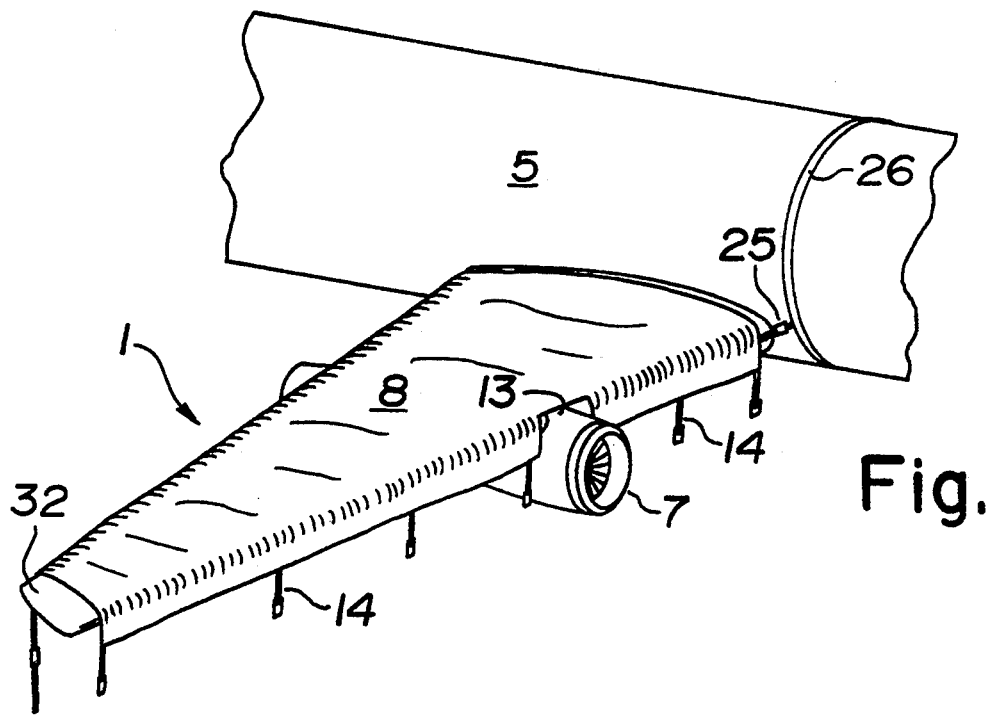
Figure 17:
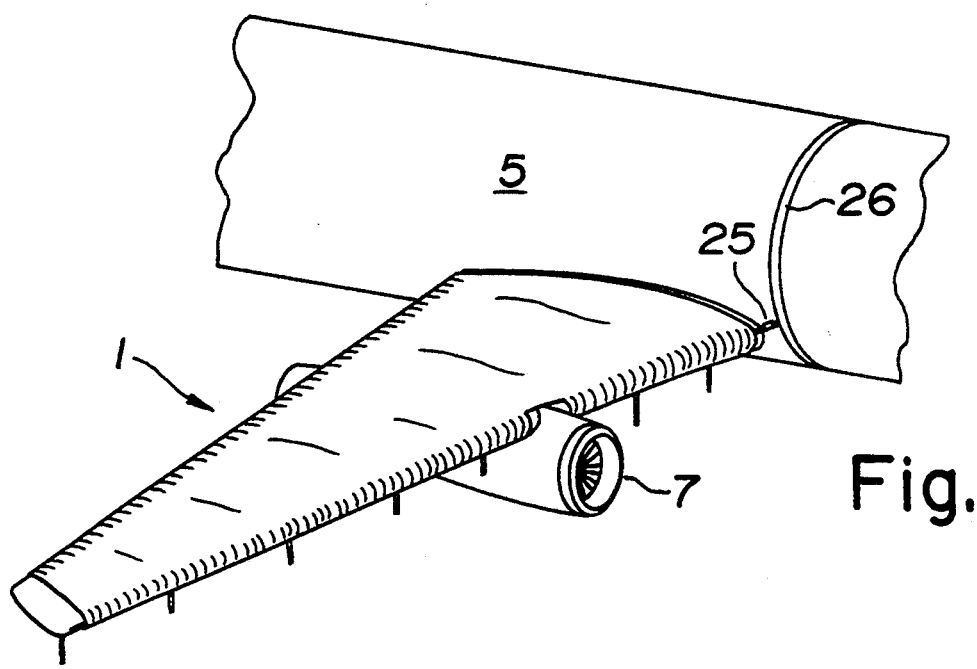

Turning now to the method for installing the cover 1, have reference to FIGS. 9 to 17. In preparation for installing the cover 1 on the wing 2, the panel 8 is laid out with its upper surface facing upwards and then is rolled up from the tip end toward the root portion 29, to form a roll 30 having its root portion 29 free. The roll 30 is placed on the root area of the wing 2, adjacent the fuselage 5, with its longitudinal axis transverse to the longitudinal projection of the wing 2 and with the root portion 29 extending along the upper surface 31 of the wing 2, as shown in FIG. 11. The collar 26 is positioned around, or the alternate belly strap 102 is positioned under the fuselage 5. The panel root portion 29 is secured to the collar 26 or belly strap 102 by strap assemblies 25 or 100 respectively. The roll 30 is then unrolled toward the wing tip 32. In windy conditions, it may be necessary to stretch each panel portion between adjacent pairs of strap assemblies 14 into good fit with the wing 2 and immediately cinch up the exposed strap assembly 14. Alternatively, as shown in the Figures, in calm conditions the roll 30 may be totally unrolled before cinching the strap assemblies 14.

As a result of the combination of the cinching capability, the fuselage connection, the custom fit of the panel to the wing involved and the cut-outs, a tight form-fit between panel and wing can be obtained, which essentially prevents wind entering between wing and panel.

To remove the cover, the strap assemblies are undone and the panel is pulled by the straps down over the trailing edge of the wing.

Figure 18:
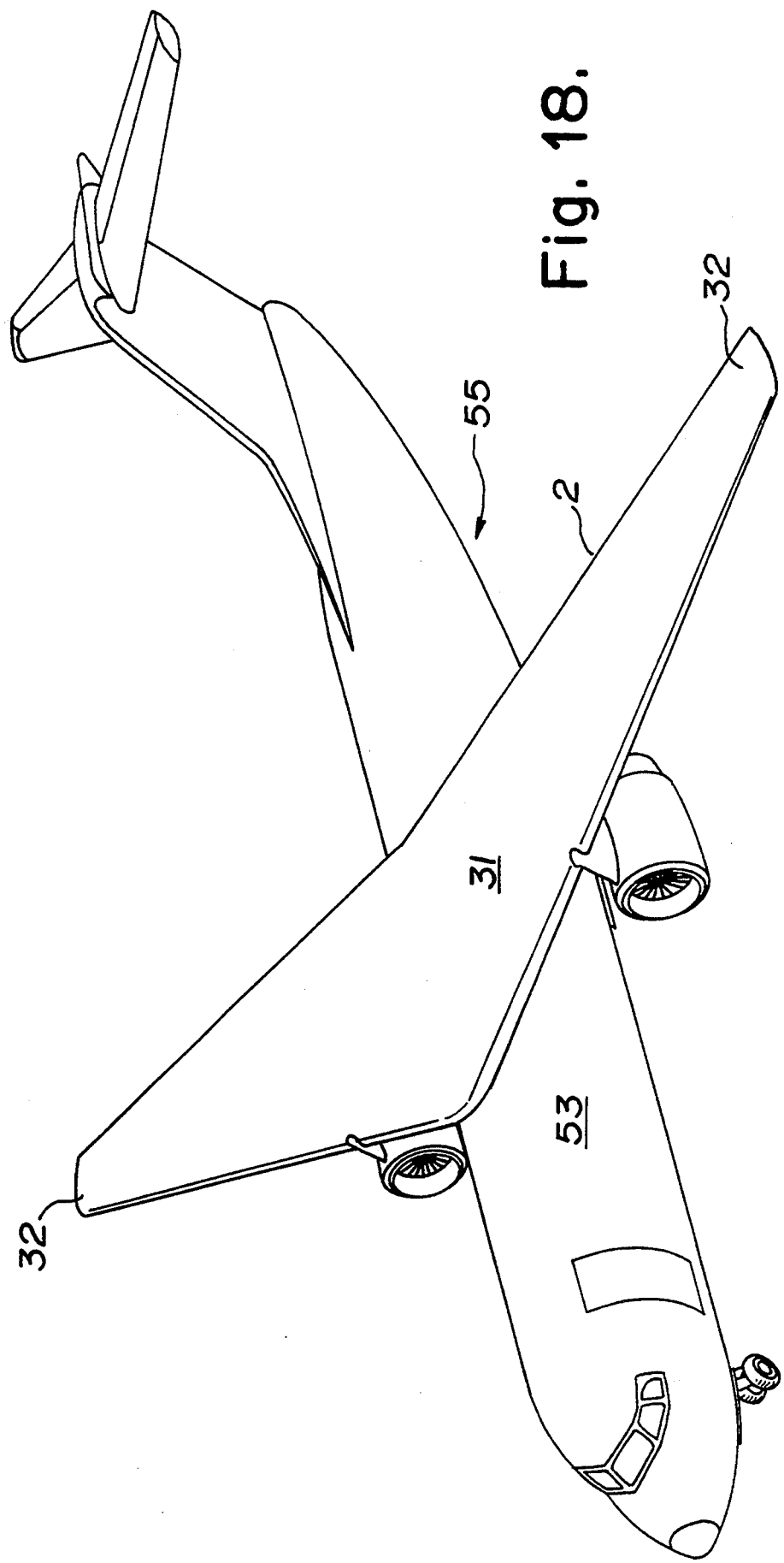
FIG. 18 is a perspective view of a high-wing aircraft.
Figure 19:
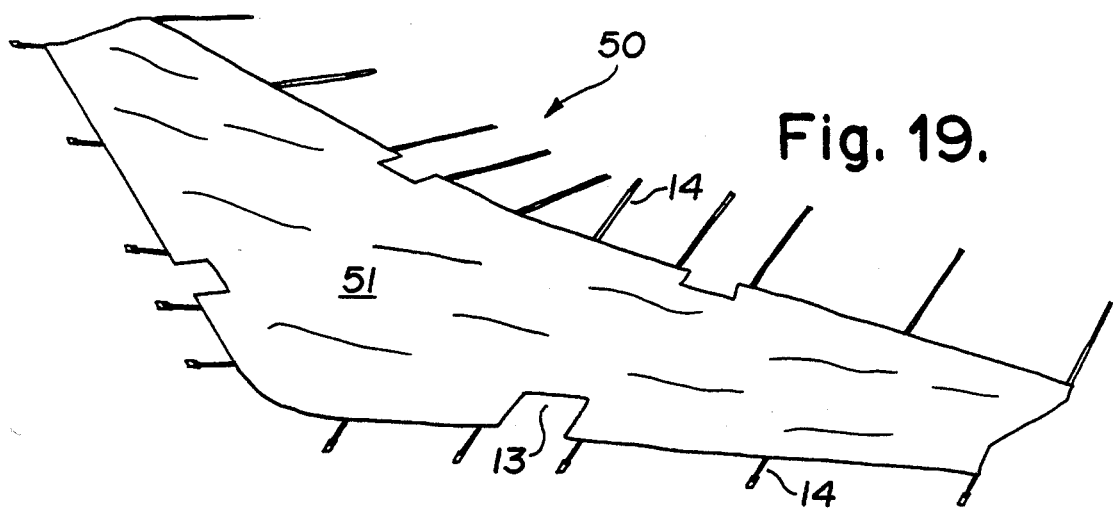
FIG. 19 is a top view of a panel for the wing of the aircraft of FIG. 18.
Figure 20:
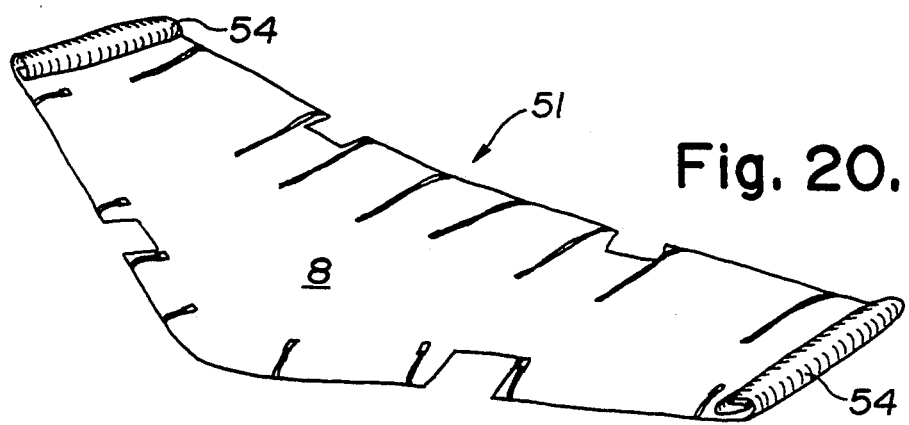
FIG. 20 is a perspective view of the panel initially being rolled up in preparation for installation.
Figure 21:
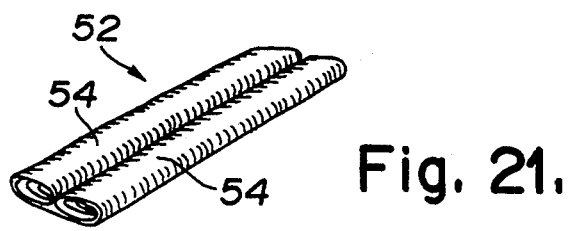
FIG. 21 is a perspective view showing the panel of FIG. 20 fully rolled up to provide a double roll.
Figure 22:
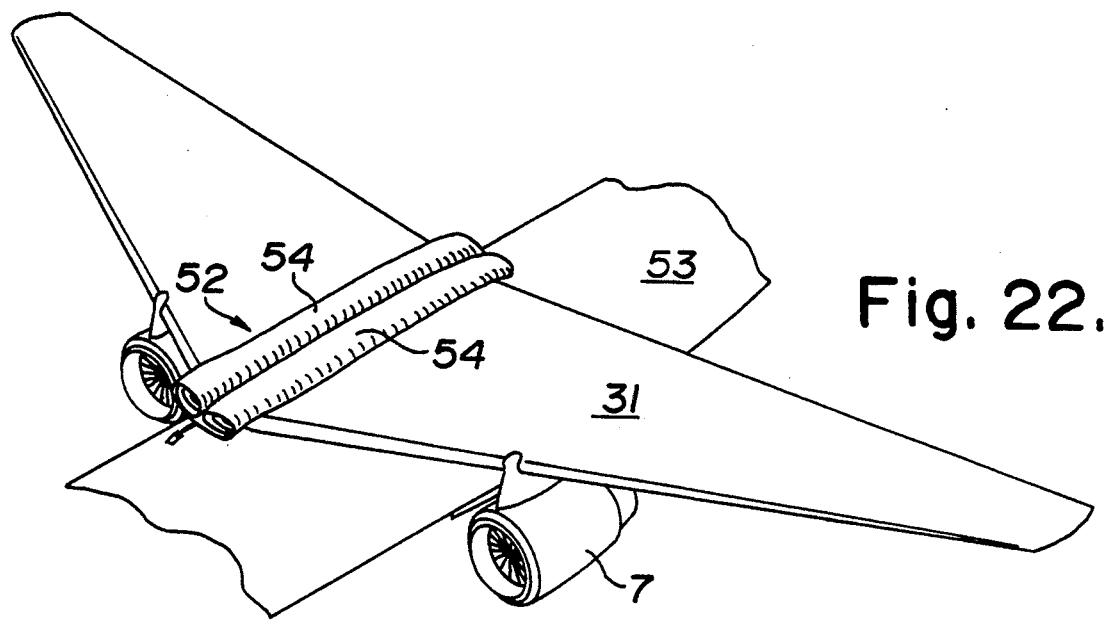
FIG. 22 is a perspective view showing the double roll of FIG. 21 in place on the wing.
Figure 23:
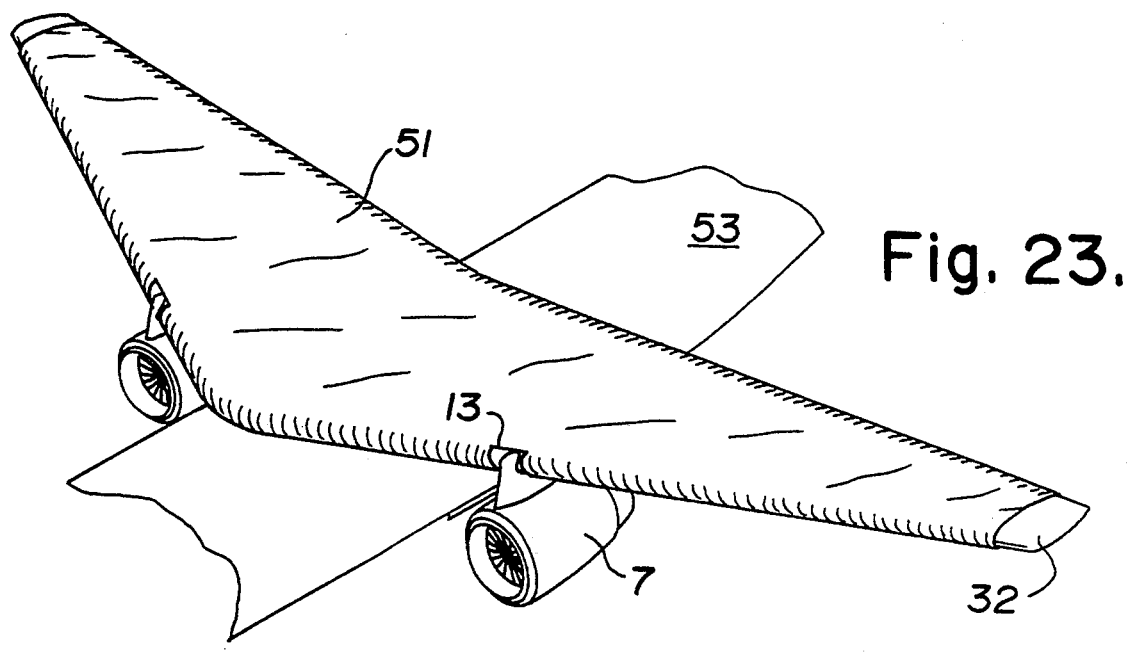
FIG. 23 shows the cover installed on the aircraft of FIG. 18.

A cover 50 suitable for high-wing aircraft 55 (FIG. 18) is shown in FIG. 19. In this case, the panel 51 can extend the full length of both wings. With respect to installation, the panel 51 is formed into a double roll 52 and placed at the center of the fuselage 53 for unrolling each roll 54 toward one of the two wing tips, as shown in FIGS. 19 to 23.

To illustrate the effectiveness of the invention and its glycol-saving capability, one wing of an MD-80 passenger jet was protected with a cover 1 and the other wing was left uncovered, on a test basis under mild winter conditions. A heavy frost was generated on both the uncovered wing and the cover of the covered wing. The cover was removed. A solution of 50/50 water-/ethylene glycol was then applied to both top and bottom surfaces of both wings, to clean the wings to an acceptable condition. 20 gallons of solution were necessary for the uncovered wing. 5 gallons were necessary for the covered wing.

The embodiments of the invention in which an exclusive property or privilege is claimed are defined as follows:

1. A protective cover for covering the wing of an aircraft having a fuselage, said wing having an upper surface and leading and trailing edges and laterally extending a substantial length from the side of said fuselage, comprising:

a substantially wing-shaped panel, having a root portion and leading, trailing and root edges, said panel being adapted to cover the upper surface of the wing along part of its length and having sufficient width so that a portion overhangs the leading edge of the wing;

said panel being formed of lightweight, ultraviolet-stabilized material which does not absorb water;

said leading overhang portion being cut-out so as to form-fit around edge protuberances of the wing; and an array of strap means, being positioned along the length of the cover in spaced apart relation along the panel's leading and trailing edges, for extending beneath the wing to secure the leading and trailing edges of the panel and to cinch the panel to the wing;

second strap means, secured to the panel substantially along a path of shortest distance extending from the panel's trailing edge, adjacent the fuselage, to the panel's leading edge, said second strap means having means for connection with an anchoring strap; and one or more rib means being secured to the panel and extending along the cover from the second strap means toward the panel's root edge.

2. The protective cover as recited in claim 1 wherein the panel has a trailing portion overhanging the wing's trailing edge, said trailing portion being cut-out at protuberances to assist in form-fitting the panel to the wing to substantially prevent air from entering between the panel and the wing surface.

* * * * *